Sept. 12, 1939.  M. SEPELAK ET AL  2,172,892
EGG OPENER
Filed Oct. 19, 1938   2 Sheets-Sheet 2

Patented Sept. 12, 1939

2,172,892

UNITED STATES PATENT OFFICE 2,172,892

EGG OPENER

Michael Sepelak and Joseph Milly,
New Castle, Pa.

Application October 19, 1938, Serial No. 235,793

1 Claim. (Cl. 146—2)

One of the objects of our invention is to provide an apparatus for the purpose indicated which is of a very simple nature and can be manufactured and sold cheaply.

The invention and its aims and objects will be clearly understood from the following description, taken in connection with the accompanying drawings, of one embodiment of the invention herein given for illustrative purposes, the true scope of the invention being more fully pointed out in the appended claim.

In the drawings:—

Similar characters of reference designate corresponding parts throughout the several views.

Figure 1:
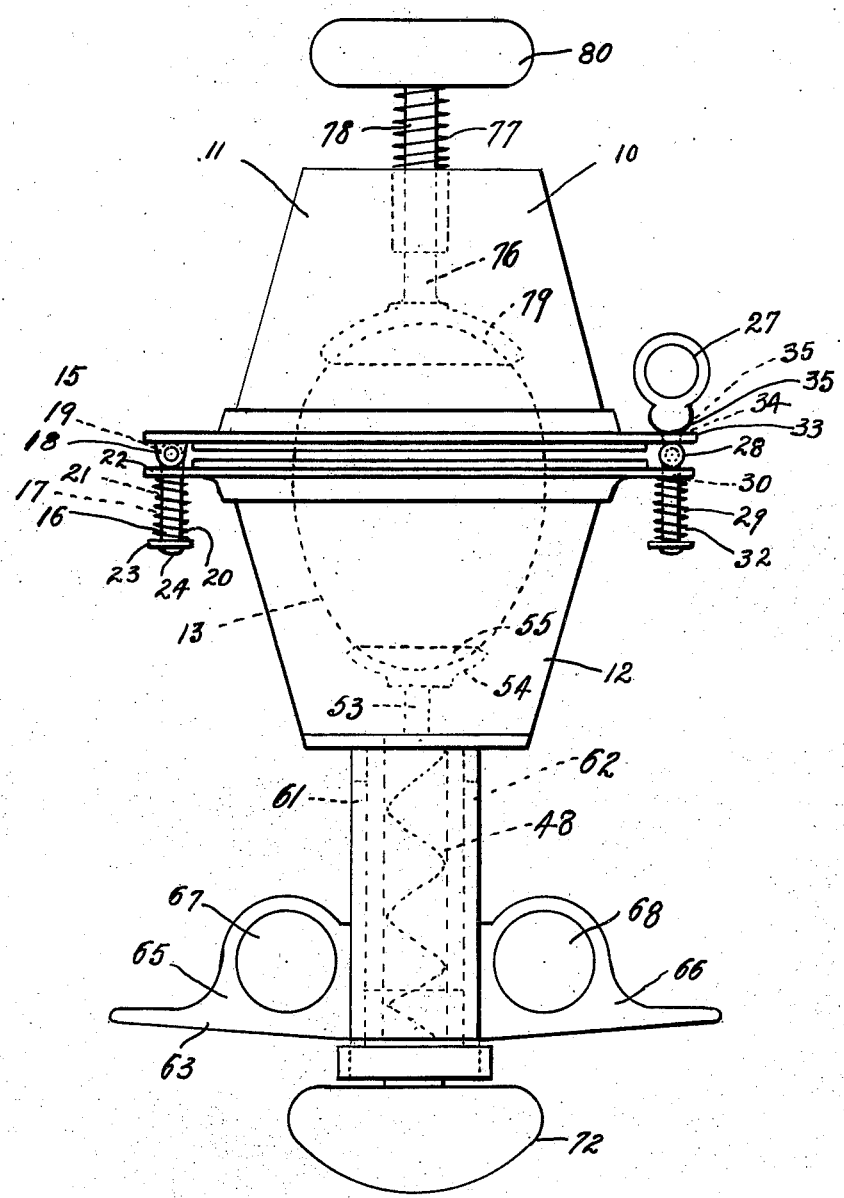
Figure 1 is a view in front elevation of an egg opener embodying the preferred form of our invention in which an egg is shown in position therein in the chain line.

Referring to the drawings 10 designates the egg container in its entirety, consisting of an upper portion 11 and a lower portion 12 to hold the egg to be opened. The egg is shown in position in Fig. 1 in the chain line 13 and is also shown fragmentary at 14 in the chain line 14 in the lower portion in Fig. 3.

The portions are hinged together as at 15. The hinge assembly comprises two rod members 16 and 17 and two lugs 18 and 19. Around each rod member 16 and 17 there is provided a helical spring 20 and 21. Each helical spring is confined between the plate 22 and the washer 23 on the end of the rod as at 24. Both rods are of the same construction so the detailed description of one, it is believed, will suffice and reference is now made for that purpose to Fig. 1. It will be noted that the rods are slidably mounted in the openings 25 and 26, see openings in Fig. 2.

Figure 2:
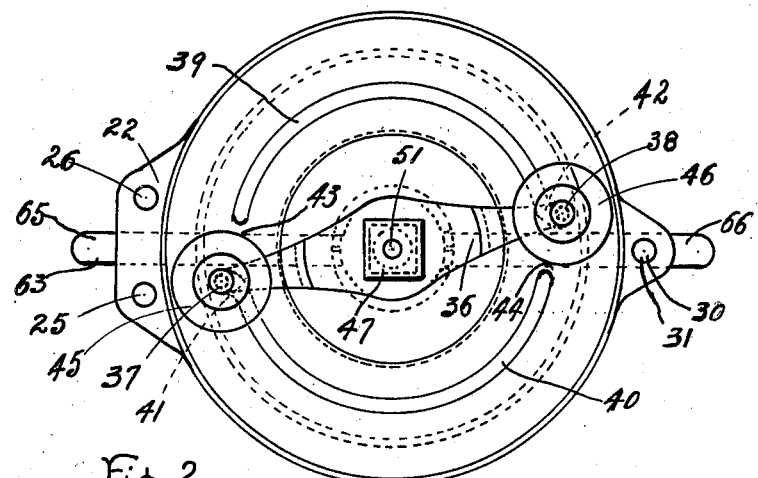
Figure 2 is a plan view of the lower portion of the opener, the top section being removed for the sake of clearness, to show the guiding slots and cutters, and other members not shown in Fig. 1.

The locking device 27 is also provided with a hinge 28, and is likewise provided with a rod 29 slidably mounted in the opening 30, see openings in Fig. 2 at 31. The helical spring on the rod 29 is shown at 32 in Fig. 1. The projection 33 is bifurcated and the bifurcations are separated to receive the portion 34 of the locking device 27. The locking device 27 is provided with cam surfaces 35, 35, so that it will operate easily against the resistance of the helical spring 32 on the rod.

The hinge and locking construction provides vertical guiding means, and means for producing uniform pressures whereby yielding movement is afforded to the upper portion, permitting various operative positions to accommodate the various sizes of eggs that may be placed in the device for the purpose of opening same.

In the lower portion 12 there is provided a U shaped member 36 having inherent resiliency. The upper end portions 37 and 38 of the aforesaid members are guided in the circumferential slots 39 and 40 formed in the plate 22 fast on the member 12. Each slot is provided at one of its ends with a laterally extending slot portion as at 41 and at 42. The interruptions 43 and 44 are provided between the slots to prevent a complete revolution of the U shaped member in the lower portion 12. The laterally extending slot portions 41 and 42 are provided to permit the cutters 45 and 46 to move outward automatically so that the cutting edges of the cutters will be free from cutting contact with the egg shell before and after the cutting operation. The outward position of the cutters before and after the opening operation also prevents injury to the operator, because the edge of the cutters are shielded by the plate 22.

The U shaped member is fast on the upper end 47 of the rod 48 helically twisted as at 49. This rod may be of cylindrical formation having a long helix therearound. The lower portion 12 is held in operative relationship with the rod by means of a shoulder 50 thereon.

Figure 3:
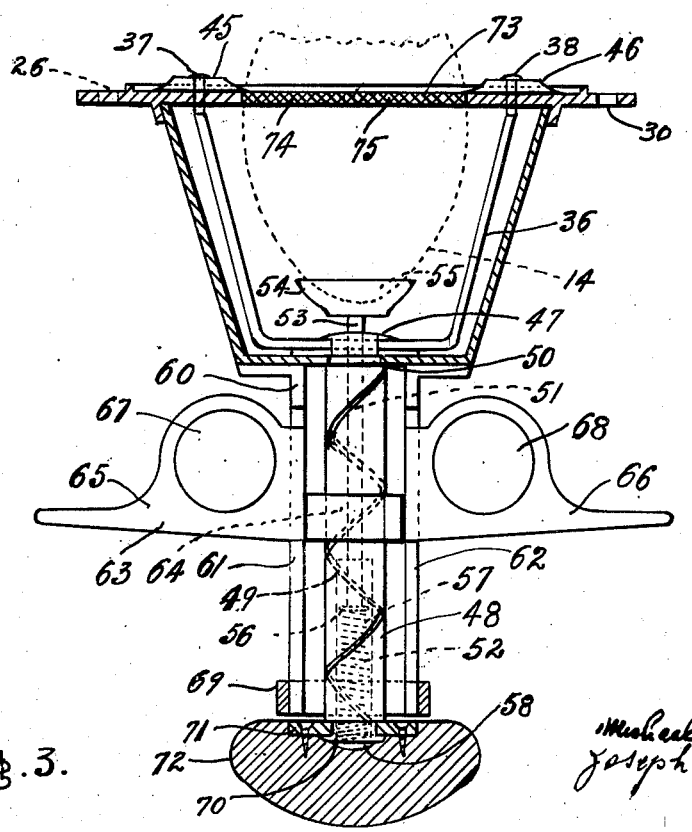
Figure 3 is a vertical section view of the lower portion with parts in position, some of which are not shown in Fig. 1 in detail.

The rod 48 is provided with an axial bore 51 and a chamber 52. In the bore 51 there is a slidably mounted rod 53 having fast on its upper end a supporting member 54 adapted to receive an end portion of an egg as shown in Fig. 1 and Fig. 3 at 55. This member 54 is not shown in Fig. 2, the same being removed therefrom to show the construction of the U shaped member and how it is fastened to the upper end of the twisted rod 48. On the lower end of the slidably mounted rod 53 there is provided a washer 56. This washer is fast on the rod and prevents the rod from being detached from the device. In the chamber 52 below the washer there is provided a helical spring 57 adapted to provide a resilient suspension means at the extremity of the egg proper. The helical spring is held in the chamber by means of a threaded plug 58.

The twisted rod is partly enclosed by two semicylindrical members 59 and 60 fixed at their upper ends to the member 12. The semicylindrical members are so constructed and arranged that they form diametrically aligned slots 61 and 62.

On the centrally disposed helically twisted rod there is provided a slidably mounted member 63 having a portion 64 threaded internally to receive the helically twisted rod. The portion 64 of the member 63 is shaped to conform to and with the inner wall of the semicylindrical sections, and is provided with oppositely positioned arm portions 65 and 66. The arm portions are each provided with an opening at 67 and 68, ample to accommodate a finger when inserted therein. The openings are so positioned that one finger is positioned on either side of the semicylindrical members when in use. The member 63 is prevented from being disengaged from the rod and the device by means of the collar 69 fast on the lower portion of the assembled semicylindrical members.

The lower end portion 70 of the rod is freely mounted on the plate 71 secured to and in the knob 72, so that the rod can rotate while the knob is held stationary in the hand of the operator. It will be noted that the member 63 can not rotate in the semicylindrical portions but only slide therein when manual force is imparted thereto in the proper direction, with the result that the rod is given a rotary motion, and hence the U shaped member, fast on the upper end thereof, which carries the cutters, that cut through the egg shell. The wall 73 of the opening 74 in the plate 22 is provided with serrations 75, adapted to hold the egg from slipping when the cutters are passing therearound.

In the upper portion there is provided a member 76, controlled by a helical spring 77 around its shaft 78. This member is provided with an egg receiving portion 79 on its lower end, and a knob 80 on its upper end. The member is provided to hold the egg down in place in the upper portion during the opening operation.

The operation of the device is as follows:

The device is opened. The egg is placed therein. The device is locked. The lower portion with its opening mechanism is held in one hand. The upper portion is held in the other hand. The fingers are inserted in the openings adapted to receive same. The top member in the top portion is gently pressed inward against the end of the egg shell. The fingers are given a quick closing motion, which motion imparts a sliding motion to the member on the twisted rod, which in turn imparts a rotary motion to the helically twisted rod and hence to the cutters operatively associated therewith, that cut through the egg shell. The rotation of the rod is limited by the interruptions at the end of the slots. When the rod can be no longer rotated the fingers are given a quick opening action to return the cutters to their initial position. When the cutters return to their initial position they are automatically moved outward into the lateral slots. The device may then be opened and the egg removed therefrom.

While we have illustrated a particular embodiment of the device effective to operate as hereinbefore described, we do not wish to be limited thereto, as many modifications may be made without departing from the spirit and scope of our invention, and we desire therefore, that only such limitations shall be placed thereon as are imposed by the prior art or are specifically set forth in the appended claim.

We claim as our invention:

An egg cutting device of the class described including in combination, a lower cup-shaped portion opening upwardly, an upper cup-shaped portion opening downwardly, hinge means for retaining the aforesaid portions in opposed open-ended spaced relationship forming an egg holder, means whereby yielding movement is afforded to produce uniform pressure of the upper portion with the lower portion when locked, an annular plate fast on the upper end of the lower cup-shaped portion having interrupted circumferentially disposed slots, each slot having a slight transverse slot extension, a helically twisted rod having cooperating means therewith consisting of a U shaped member fast on the upper end of the helically twisted rod and mounted in the lower portion, the legs of the U shaped portion mounted in the circumferentially disposed slots, a circular cutter rotatably mounted on each leg of the U shaped portion and operating in the space between the cup portions to cut a shell of an egg placed in the device, a movement translating means having laterally disposed arms having a finger receiving opening therein nonrotatable axially movable on the helically twisted rod and adapted to impart rotation to the helical rod and hence to the U shaped member and the cutters thereon, the legs of the U shaped member adapted to move laterally into the transverse slot extension to relieve the cutter from the egg shell, serrations on the inner periphery of the opening in the plate fast on the lower portion adapted to prevent rotation of the egg while the shell is being cut, and manually controlled yielding cup members in the upper and lower portions to maintain the egg in proper position during the opening operation.

MICHAEL SEPELAK.
JOSEPH MILLY.